United States Patent [19]

Wong et al.

[11] Patent Number: 5,004,232
[45] Date of Patent: Apr. 2, 1991

[54] COMPUTER GAME CARTRIDGE SECURITY CIRCUIT

[75] Inventors: John J. Wong, Atherton; Paul S. Lui, Sunnyvale, both of Calif.

[73] Assignee: Macronix, Inc., San Jose, Calif.

[21] Appl. No.: 421,164

[22] Filed: Oct. 13, 1989

[51] Int. Cl.⁵ .......................... A63F 9/22; H04L 9/00
[52] U.S. Cl. .................... 273/435; 273/85 G; 273/148 B; 380/4; 364/410; 340/825.34
[58] Field of Search .............. 273/1 E, 1 GC, 85 G, 273/DIG. 28, 148 B; 340/825.31, 825.34; 902/2, 5; 380/4, 25; 364/410

[56] References Cited

U.S. PATENT DOCUMENTS

| | | | |
|---|---|---|---|
| 4,458,315 | 7/1984 | Uchenick | 380/4 |
| 4,462,076 | 7/1984 | Smith, III | 364/200 |
| 4,562,308 | 12/1985 | Chov et al. | 380/4 |
| 4,680,731 | 8/1987 | Izumi et al. | 364/900 |
| 4,757,468 | 7/1986 | Domenik et al. | 380/4 |
| 4,799,635 | 1/1989 | Nakagawa | 340/825.31 |
| 4,803,351 | 2/1989 | Shigehaga | 340/825.34 |
| 4,865,321 | 9/1989 | Nakagawa et al. | 273/1 E |
| 4,882,752 | 11/1989 | Lindman et al. | 340/825.34 |

Primary Examiner—Edward M. Coven
Assistant Examiner—Jessica J. Harrison
Attorney, Agent, or Firm—Majestic, Parsons, Siebert & Hsue

[57] ABSTRACT

A plug-in game cartridge, having a read-only-memory (ROM) that stores software of the game, also includes a security circuit that generates a signal which causes a host videographics console unit to accept it as authorized. The security circuit produces a replica of a reset signal that exists in the console unit and uses that replica to control the timing of pulses that form the authorizing signal. The cartridge with the security circuit can be used with a Nintendo brand videographics unit.

18 Claims, 2 Drawing Sheets

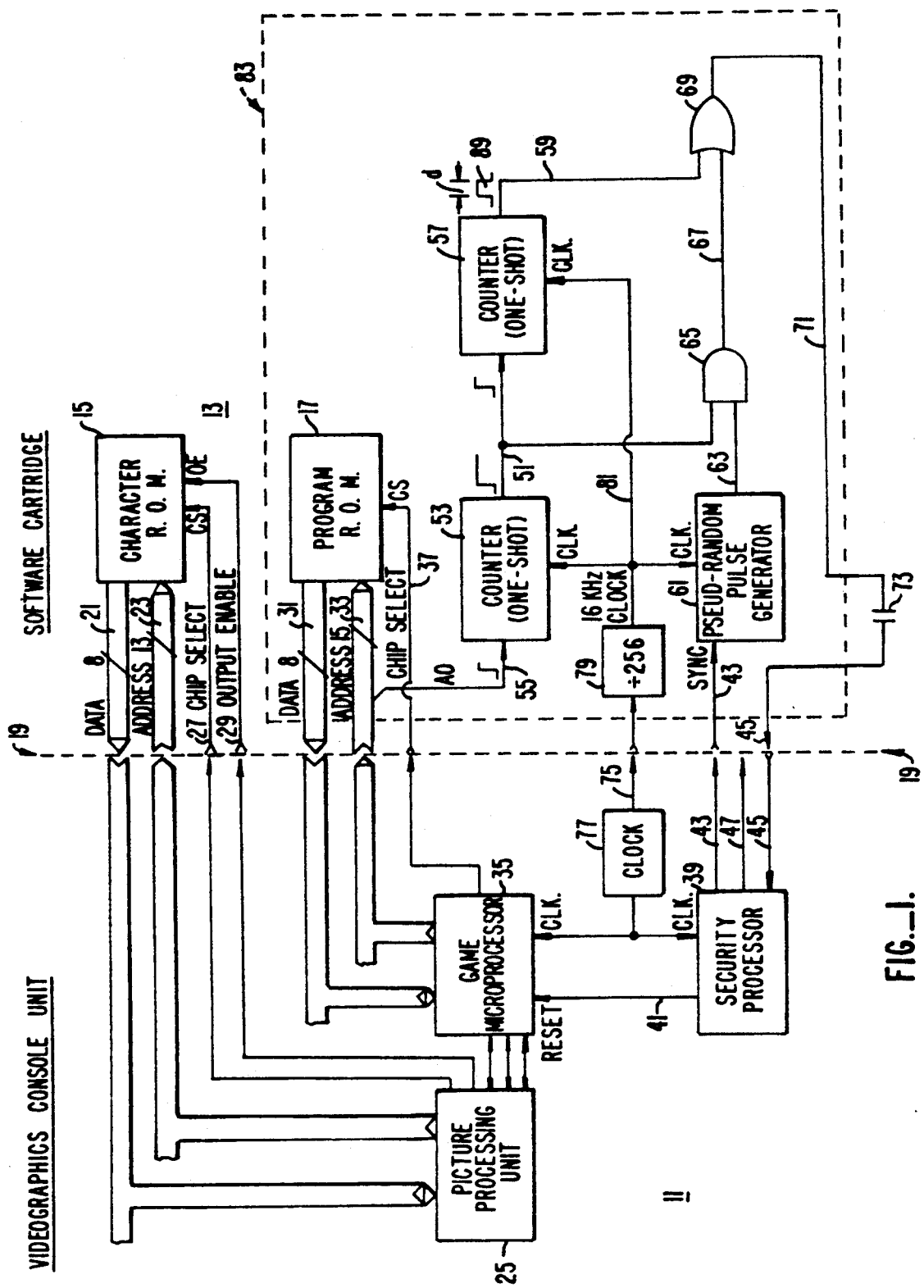
FIG._1.

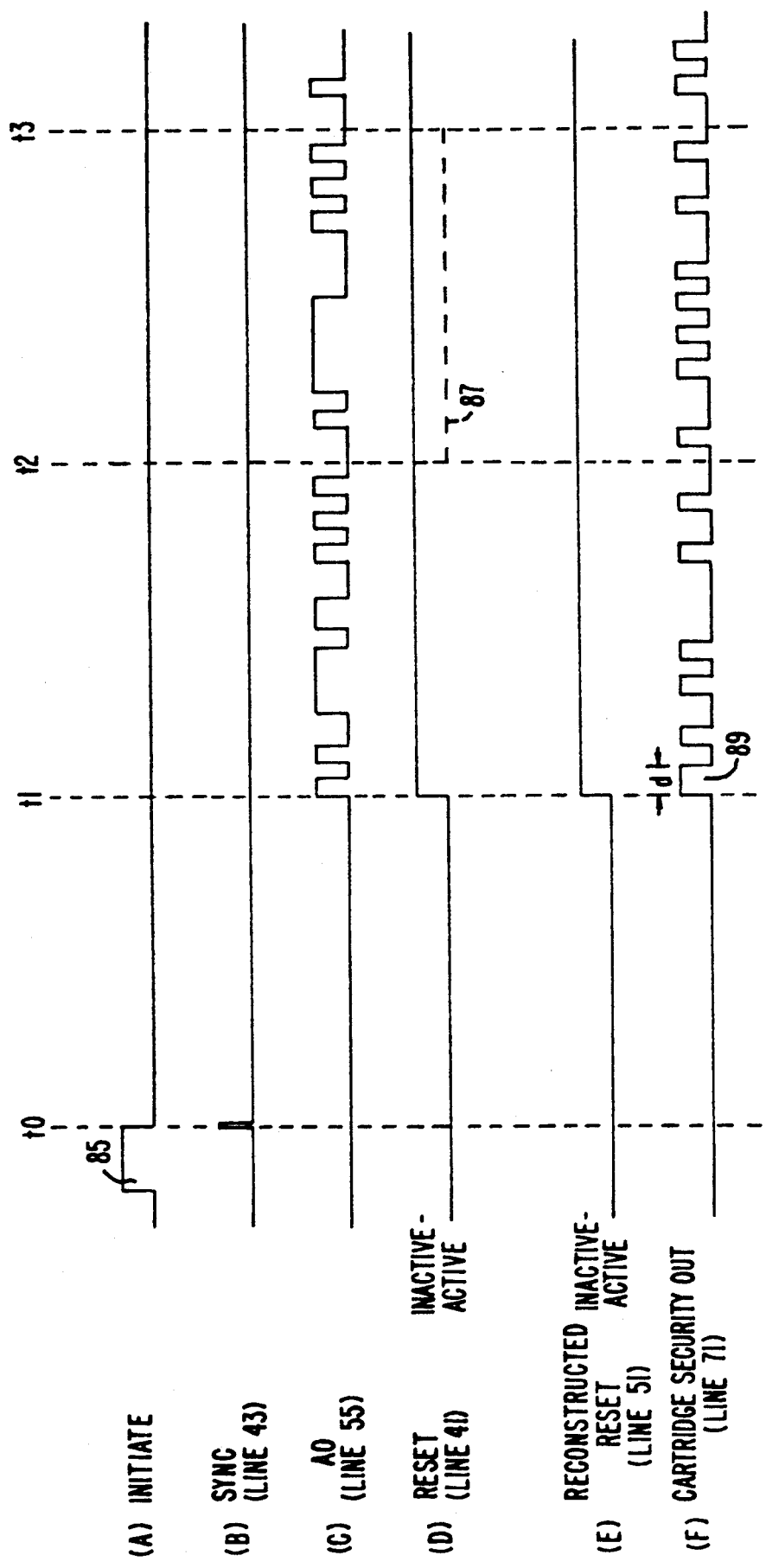
FIG._2.

COMPUTER GAME CARTRIDGE SECURITY CIRCUIT

BACKGROUND OF THE INVENTION

This invention relates generally to computer system software authentication techniques, and more specifically, to such techniques for authenticating video game software cartridges.

Videographics computer game systems are well known, popular consumer products. A typical system includes a console that connects to an ordinary television set for displaying images of the game. The console receives controlling game software from a read only memory (ROM) that is usually packaged in the form of a cartridge. The cartridge is removably plugged into the game console. Some pointing device, such as a joystick, is also connected with the game console in order to allow the player to input positional information that is used by the controlling software to execute playing of the game.

An example of such a system is one manufactured by The Nintendo Co., Ltd., of Kyoto, Japan and widely distributed in many countries including the United States. The Nintendo brand videographics game system includes cooperating security circuits in the console and in the cartridge as a means to restrict the ROM cartridges that can be used with the game system to those authorized by the Nintendo company. U.S. Pat. No. 4,799,635 - Nakagawa (1989) of the Nintendo Co. is directed to such an authentication technique. Software controlled microprocessors exist in each of the game unit and the cartridge for executing related algorithms whose results are then compared. When a game cartridge is inserted into the console, a satisfactory comparison must be made before the game unit will accept and operate with the cartridge. This approach is rather complicated and adds to the cost of manufacturing the cartridge.

Therefore, it is the primary object of the present invention to provide a simpler security circuit for a ROM game cartridge that causes such a host game console to accept the cartridge and execute the game in accordance with the software stored in it.

SUMMARY OF THE INVENTION

This and additional objects are accomplished by the present invention wherein, briefly and generally, an authentication signal is generated within the cartridge that is coordinated with the functioning of the host processor security circuit in a manner to be inactive while the host processor is inactive and to generate a train of pulses when the host processor is active. It has been found that a Nintendo brand game console periodically cycles between active and inactive states while waiting for the proper signals from a game cartridge in order to authenticate it. The game cartridge security circuit of the present invention monitors that activity through address lines to the cartridge ROM and causes a series of pulses to commence substantially immediately upon it being sensed that the host game console has transitioned from an inactive to an active state. This is accomplished by a simple, hard wired logic circuit that can be implemented as part of an integrated circuit chip that includes all or part of the ROM. This circuit is much simpler and less expensive than the software program controlled microprocessor security system described in the aforementioned Nintendo patent.

Additional objects, advantages and features of the present invention will become apparent from the following description of a preferred embodiment thereof, which description should be taken in conjunction with the accompanying drawings.

BRIEF DESCRIPTION OF THE DRAWINGS

FIG. 1 is an electronic schematic diagram of a software game cartridge including the improved security circuit of the present invention and its interaction with a host game console unit; and FIGS. 2(A) through 2(F) illustrate sample waveforms at various points of the system of FIG. 1.

DESCRIPTION OF A PREFERRED EMBODIMENT

Referring to FIG. 1, a portion 11 of a Nintendo brand videographics console unit is illustrated on the left-hand side. On the right-hand side, a circuit diagram for a software cartridge 13 is given. The cartridge 13 includes a character ROM 15 and a program ROM 17 which together carry the controlling software and videographics displays that are used by the console unit 11 to execute a particular game or other type of program. The cartridge 13 electrically interconnects with the console unit 11 by a connector indicated along the vertical dashed line 19.

Included among the conductors that are interconnected between the cartridge and console are multi-conductor data and address busses 21 and 23 that are connected to the character ROM 15 of the cartridge. It is believed that the character ROM 15 is connected to a picture processing unit 25 of the console unit, as well as perhaps to other videographic system circuit components. Two control lines 27 and 29 are also connected between the picture processing unit 25 and character ROM 15.

Multi-conductor data and address busses 31 and 33 are connected with the program ROM 17. It is understood that these busses are connected through the connector 19 to similar busses within the console unit 11. A game microprocessor 35 is one of the elements that is connected with these bus lines. A control line 37 also originates from the microprocessor 35 and is connected with the program ROM 17.

The console unit 11 also includes a security processor 39 that generates a reset signal in a line 41 that causes the game microprocessor 35 to be rendered inactive when the reset signal is active. The security processor 39 generates a synchronous pulse in a line 43 that is connected with the cartridge 13. The security processor 39 receives authenticating signals from the cartridge on a line 45 and includes another line 47 on which it sends corresponding authenticating signals to the cartridge. However, the line 47 that exists in Nintendo brand videographic console units is not utilized by the software cartridge 13 of FIG. 1. The security circuit of that cartridge generates an appropriate authenticating signal in the line 45 that causes the security processor 39 to inactivate the reset signal in the line 41 and thus allow the microprocessor 35 to operate in response to the game program software contained in the cartridge ROM.

It has been found to be important for the cartridge 13 to have access to the reset signal 41 in order to generate an appropriate authentication signal for the line 45 of the security processor 39. However, that signal is not available on the connector 19 of the console unit. Therefore, the security circuit of the cartridge 13 reconstructs the reset signal in a line 51 at an output of a digital counter 53. The digital counter 53 operates in the nature of a one-shot multivibrator by initiating an output pulse at the leading edge of an input pulse in a line 55. The line 55 is connected to the least significant address line A0 of the address bus 33. Since that bus is connected with the microprocessor 35, there will be no activity on it while the microprocessor 35 is reset in response to an active reset signal in the line 41. But when the reset signal is released, there is then activity on the address bus 33.

A second digital counter 57, also operating in the nature of a one-shot multivibrator, generates an output pulse in a line 59 of a fixed duration in response to a leading edge of the reconstructed reset signal in the line 51.

The cartridge security circuit also includes a pseudo-random generator 61. It is initiated to generate a pseudo-random pulse output in the line 63 in response to a synchronous pulse input from the console unit in a line 43. An AND-gate 65 allows the pulses in the line 63 to pass to an output line 67 of the AND-gate when the reconstructed reset signal in the line 51 is inactive (that is, when the microprocessor 35 is allowed to function in the absence of a reset signal).

An OR-gate 69 carries the pulses on either of the lines 59 or 67 in an output line 71. This line 71 passes through a series capacitor 73 and is then connected to the line 45 of the security processor 39 of the console unit 11. The series capacitor 73 provides an alternate current (a.c.) coupling between the security circuit of the software cartridge 13 and the security processor 39 of the console unit 11.

The security circuit of the cartridge 13 operates in synchronism with the console unit 11 by being connected through the connector 19 to a clock signal in a line 75 from a console clock generator 77. A 4 MHz clock signal in the line 75 is divided by a divider circuit 79 in the cartridge 13. The result is a 16 KHz clock signal in the line 81 that is used to drive the digital counters 53 and 57, and the pulse generator 61.

It can be seen from FIG. 1 how simple the security circuit can be made: a pair of digital counters, a pulse generator, a clock dividing circuit, two simple gates and a capacitor. All of this, except for the capacitor 73, are conveniently formed on a single integrated circuit chip along with the program ROM 17. The components for a single integrated circuit chip are shown within dotted outline 83.

Operation of the security circuit of FIG. 1 will better be understood with reference to its timing diagrams of FIG. 2. FIGS. 2(A) through 2(D) show timing diagrams at four different locations within the console unit 11 of FIG. 1. FIGS. 2(E) and 2(F) show signals generated within the cartridge 13 itself.

To initiate play with the console unit 11, a reset button (not shown) is pushed by the game player and this is indicated by a pulse 85 of FIG. 2(A). When the button is released, at time t0, the trailing edge of that pulse causes a synchronous pulse to be generated in line 43, as indicated in FIG. 2(B). It has been found that the reset signal in the line 41 will initially be active to hold the microprocessor 35 in a reset state from a first time period from time t0 until time t1. This duration is something slightly less than one second. In a next similar time period, from time t1 to time t2, the security processor 39 releases the reset signal and allows the microprocessor 35 to become active. Thus, there will be some activity in the A0 address line of the microprocessor 35, as indicated in FIG. 2(C). At time t2, the microprocessor 35 will again be reset, as indicated in dashed outline 87 of FIG. 2(D), unless the security processor 39 has authenticated the game software cartridge that is then in place in the console unit. The signal in the address line 55 would then also become inactive during this time period t2-t3. However, if the cartridge is accepted as authentic, the reset signal in the line 41 remains inactive as indicated by the solid line of FIG. 2(D), and the address line remains active, as also indicated by the example signal of FIG. 2(C).

As soon as the address line A0 goes active, indicated by FIG. 2(C) to occur at time t1, the digital counter 53 initiates an output pulse at that same time as indicated by FIG. 2(E). Each successive leading edge of the address signal of FIG. 2(C) in line 55 causes the counter 53 to be retriggered for a period that is long enough to assure that the reset signal in line 51 remains inactive for the duration of operation of the system with the cartridge 13, as indicated in FIG. 2(E).

The remaining elements of the security circuit of the cartridge 13 are designed to generate a waveform similar to that shown by FIG. 2(F). The important characteristics of that waveform are that no signal is present between the times t0 and t1, when the game microprocessor 35 is initially reset, while a signal of a train of pulses commences at time t1 when the microprocessor 35 begins operation. A first pulse 89 of the signal of FIG. 2(F) occurs with a leading edge substantially coincident with that of the reconstructed reset signal of FIG. 2(E), at time t1. This is accomplished by triggering the digital counter 57 with the leading edge of the reconstructed reset signal. The pulse 89 has a fixed duration "d" that is set by the parameters of the counter 57. That duration "d" is preferably in excess of about 100 microseconds. Each of the pulses following the initial pulse 89, as shown in FIG. 2(F), is the result of the pulse generator 61. It is not necessary that the pulse generator 61 be pseudo-random, but that is preferred. The security circuit would be operable if the pulse generator 61 generated regularly recurring pulses. In either case, the AND-gate 65 inhibits those pulses from being connected to the security output signal line 71 except when the reconstructed reset signal in line 51 (FIG. 2(E)) is inactive. The pulse train of FIG. 2(F) is applied through the series capacitor 73 to the security processor 39 through the line 45.

Although the present invention has been described with respect to a preferred embodiment, it will be understood that the invention is entitled to protection within the full scope of the appended claims.

It is claimed:

1. A method of activating a computer system to function with a memory cartridge wherein the computer system including a microprocessor operates upon initialization to hold the microprocessor in a reset state for a time and then to cycle it between reset and operable states by a periodically varying reset signal until the cartridge communicates a proper security signal to the computer system over a security circuit, comprising the following steps occurring in the cartridge:

sensing the periodically varying reset signal of the computer system, whereby the sensed reset signal begins in a reset state for a time after initialization and then switches to an operable state, holding a security signal from the cartridge inactive while the sensed reset signal is in its initial reset state, and generating a security signal on said security circuit when the sensed reset signal is in its operable state, said security signal being in the form of a sequence of pulses on the security circuit wherein the first pulse of the sequence occurs substantially simultaneously with the sensed reset signal switching to its said operable state from its reset state, whereby the computer system reset signal allows the microprocessor to operate so long as the pulses continue.

2. The method according to claim 1 wherein the step of generating a sequence of pulses includes the steps of:

generating the first pulse of the sequence of pulses to have a fixed duration, and generating the pulses after the first pulse to occur pseudo-randomly.

3. For a computer system having a security circuit that disables operation of the system for a time upon its initialization and then cycles it between being enabled and disabled by a periodically varying reset signal until a proper authentication signal is communicated to the system, a removable memory device comprising:

a computer memory containing a stored software program that is electrically connectable to said computer system, means connectable to said computer system for reconstructing the periodically varying reset signal, whereby said reconstructed reset signal begins in a disabled state for a time after initialization and then switches to an enabled state, means connected to said reconstructing means and responsive to the reconstructed reset signal for generating a security signal characterized by being inactive while said reconstructed reset signal is in the disabled state and active while the reconstructed reset signal is in the enable state, said security signal changing from its said inactive state to its said active state substantially coincident with the reconstructed reset signal changing from its disabled state to its enabled state, and means for connecting the security signal with the security circuit of the computer system.

4. The computer system removable memory device according to claim 3 wherein said security signal generating means includes means responsive to the reconstructed reset signal for generating a pulse having a leading edge that is substantially coincident with the switching of the reconstructed reset signal from its disabled to enabled state.

5. The computer system removable memory device according to claim 3 wherein said computer system includes an address bus, and wherein said reset signal reconstructing means includes means connected to said bus and responsive to a least significant bit of the computer system address bus for driving the reconstructed reset signal to its enabled state for a time after a transition of the least significant address bit value.

6. The computer system removable memory device according to claim 3 wherein the computer system with which it operates includes a videographics console having a plug and said removable memory device is in the form of a plug-in cartridge adapted to fit into said plug.

7. The computer system removable memory device according to claim 3 wherein said computer memory includes read-only memory (ROM), and further wherein at least a portion of said ROM, said reconstructing means, and said security signal generating means are formed as part of a single integrated circuit chip.

8. The computer system removable memory device according to claim 3 wherein said security signal connection means includes a series capacitor.

9. A computer game cartridge, comprising:

a case, a first connector part provided along an edge of the case and adapted to mate with a second connector part on a videographics console computer system, thereby electrically interconnecting signals between the cartridge and the console, a computer memory containing a software program housed within said case and electrically connected to said first connector part, means within said case attached to said first connector part and responsive to a first interconnectable signal for generating an activity signal having an active state when the console computer system is active and an inactive state when the console computer system is inactive, and means within said case attached to said activity signal generating means and responsive to said activity signal for generating a second interconnectable signal connected to said first connector part, said second interconnectable signal being in an inactive state when said activity signal is inactive and including a series of pulses when said activity signal is in an active state.

10. The computer game cartridge according to claim 9 wherein the second interconnectable signal generating means includes means responsive to said activity signal for generating a first pulse of said series of pulses with a leading edge substantially coincident with the activity signal changing from its said inactive state to its said active state.

11. The computer game cartridge according to claim 9 wherein second interconnectable signal includes a signal generated by a pseudo-random pulse generator.

12. The computer game cartridge according to claim 9 wherein the memory electrical connections with said first connector part include an address bus, and wherein said first interconnectable signal originates from said address bus.

13. An electronic system, comprising on a single intergrated circuit chip:

a computer memory having a plurality of address and data bus connections, means attached to at least one of said bus connections and responsive to signals received on said bus connections for generating an activity signal having an active state when there is signal activity on said bus and an inactive state when there is no signal activity on said bus, and means connected to said activity signal generating means and responsive to said activity signal for generating a security signal at another connection, said security signal being in an inactive state when said activity signal is inactive and including a series of pulses when said activity signal is in an active state.

14. A method of activating a computer video game system to function with a game memory cartridge wherein the computer system including a microprocessor operating upon initialization by holding the microprocessor in a inactive state for a time and then to cycle it between inactive and active states until the cartridge communicates a proper security signal to the computer system over a security circuit, comprising the following steps occurring in the cartridge:

recognizing when the computer system microprocessor is inactive or active, holding a security signal from the cartridge inactive while the computer system microprocessor is sensed to be inactive, and generating a security signal on said security circuit when the computer system microprocessor is recognized to be active, said security signal being in the form of a sequence of pulses on the security circuit wherein the first pulse of the sequence occurs substantially simultaneously with the microprocessor switching to its said active state from its inactive state, whereby the computer system reset signal allows the microprocessor to operate.

15. The method according to claim 14 wherein the step of generating a sequence of pulses includes the steps of:

generating the first pulse of the sequence of pulses to have a fixed duration, and generating the pulses after the first pulse to occur pseudo-randomly.

16. For a computer game system having a security circuit that disables operation of the system for a time upon its initialization and then cycles it between enabled and disabled states until a proper authentication signal is communicated to the system, a removable memory device comprising:

a computer memory containing a stored game software program that is electrically connectable to said computer system, means connectable to said computer system for identifying when the computer system is in its said enabled state and when it is in its said disabled state, whereby the disabled state is identified for a time after initialization until the computer system is known to switch to the enabled state, means connected to said identifying means for generating a security signal characterized by being inactive while said computer system is known to be in the disabled state and active while the computer system is known to be in the enable state, said security signal changing from its said inactive state to its said active state substantially coincident with the computer system being switched to an enabled state, and means responsive to said generating means for connecting the security signal with the security circuit of the computer system as said proper authentication signal.

17. The computer system removable memory device according to claim 16 wherein said security signal generating means includes means for generating a pulse having a leading edge that is substantially coincident with the switching of the computer system from its said disabled to its said enabled state.

18. The computer system removable memory device according to claim 16 wherein said computer memory includes read-only-memory (ROM), and further wherein at least a portion of said ROM, said detecting means, and said security signal generating means are formed as part of a single integrated circuit chip.

* * * * *